United States Patent
Liegeois

(10) Patent No.: US 12,208,918 B2
(45) Date of Patent: Jan. 28, 2025

(54) LANDING GEAR WITH LIGHTNING PROTECTION

(71) Applicant: SAFRAN LANDING SYSTEMS, Velizy-Villacoublay (FR)

(72) Inventor: Pierre-Yves Liegeois, Moissy-Cramayel (FR)

(73) Assignee: SAFRAN LANDING SYSTEMS, Vélizy-Villacoublay (FR)

( * ) Notice: Subject to any disclaimer, the term of this patent is extended or adjusted under 35 U.S.C. 154(b) by 180 days.

(21) Appl. No.: 17/999,274

(22) PCT Filed: May 18, 2021

(86) PCT No.: PCT/EP2021/063203
§ 371 (c)(1),
(2) Date: Nov. 18, 2022

(87) PCT Pub. No.: WO2021/233949
PCT Pub. Date: Nov. 25, 2021

(65) Prior Publication Data
US 2023/0234719 A1    Jul. 27, 2023

(30) Foreign Application Priority Data
May 20, 2020 (FR) ........................ 2005194

(51) Int. Cl.
*B64D 45/02* (2006.01)
*B64C 25/00* (2006.01)
*B64C 25/32* (2006.01)

(52) U.S. Cl.
CPC ............ *B64D 45/02* (2013.01); *B64C 25/001* (2013.01); *B64C 25/405* (2013.01)

(58) Field of Classification Search
CPC ..... B64C 25/001; B64C 25/405; B64C 25/42; B64D 45/02; Y02T 50/80
USPC .......................................................... 361/218
See application file for complete search history.

(56) References Cited

U.S. PATENT DOCUMENTS

| | | | |
|---|---|---|---|
| 3,416,027 A | 12/1968 | Amason et al. | |
| 2006/0022088 A1* | 2/2006 | Dazet | B64C 1/06 244/121 |
| 2019/0170338 A1* | 6/2019 | Kung | B64D 45/02 |

(Continued)

FOREIGN PATENT DOCUMENTS

| | | |
|---|---|---|
| EP | 1 544 104 A1 | 6/2005 |
| EP | 3 560 827 A1 | 10/2019 |

OTHER PUBLICATIONS

International Search Report mailed Aug. 4, 2021, issued in corresponding International Application No. PCT/EP2021/063203, filed May 18, 2021, 5 pages.

(Continued)

*Primary Examiner* — Kevin J Comber
(74) *Attorney, Agent, or Firm* — CHRISTENSEN O'CONNOR JOHNSON KINDNESS PLLC

(57) ABSTRACT

A landing gear of an aircraft includes a pair of wheels between which an electric actuator at least partially covered with a lightning arrester cowl is placed. The lightning arrester cowl has an insulating matrix onto which at least an electrical conductor is attached. The electrical conductor includes electrical connection means for connecting the electrical conductor to a ground conductor of the aircraft.

19 Claims, 5 Drawing Sheets

(56) References Cited

U.S. PATENT DOCUMENTS

2019/0329902 A1* 10/2019 Gui ...................... B64D 45/02

OTHER PUBLICATIONS

Written Opinion mailed Aug. 4, 2021, issued in corresponding International Application No. PCT/EP2021/063203, filed May 18, 2021, 6 pages.
English translation of Written Opinion mailed Aug. 4, 2021, issued in corresponding International Application No. PCT/EP2021/063203, filed May 18, 2021, 7 pages.
International Preliminary Report on Patentability mailed Nov. 17, 2022, issued in corresponding International Application No. PCT/EP2021/063203, filed May 18, 2021, 7 pages.

* cited by examiner

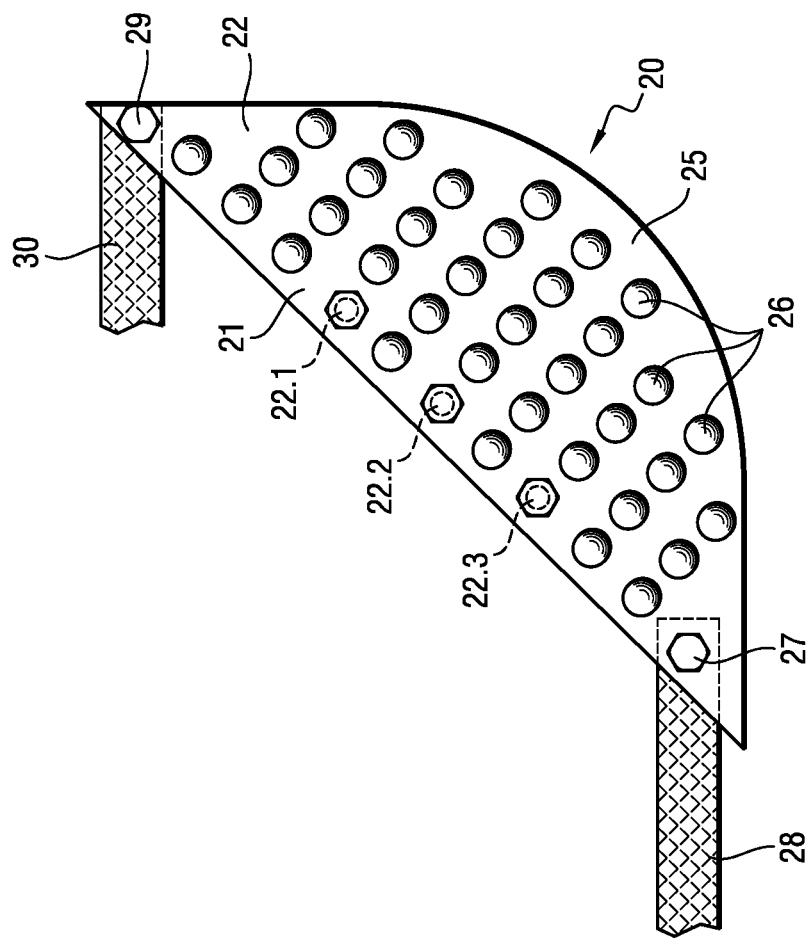
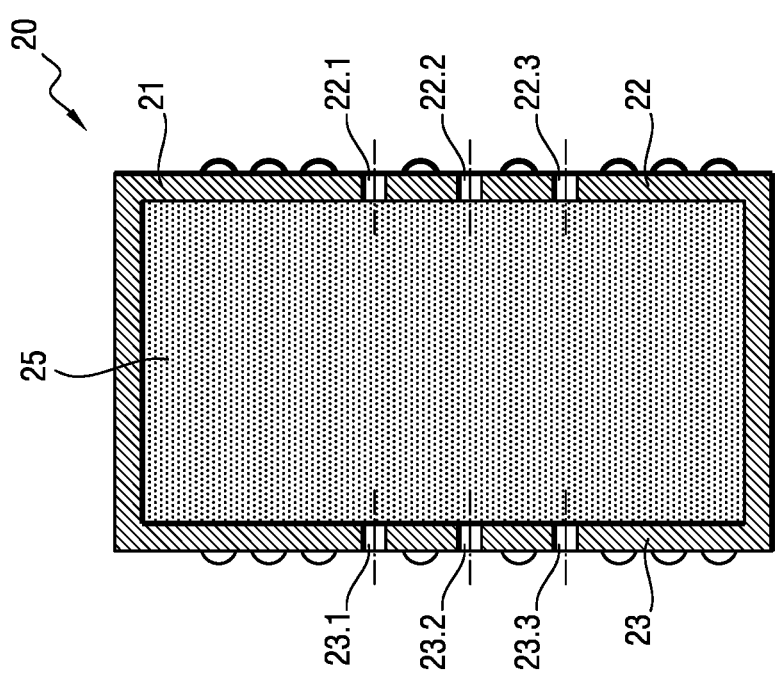

LANDING GEAR WITH LIGHTNING PROTECTION[1]

FIELD OF THE DISCLOSURE

The disclosure relates to the field of protecting aircraft and more specifically, lightning protection devices for landing gears.

BACKGROUND

Conventionally, an aircraft landing gear comprises one or more pairs of wheels mounted on a landing gear strut and a braking device connected to the aircraft by hydraulic metal conduits and/or electric control and/or power cables. These elements are electrically conductive and are protected from lightning by being positioned inside a volume delimited by the periphery of the wheels.

Yet, it is provided to dispose an electric taxiing actuator between the wheels, making it possible to motorise the rotation of the wheels. It is therefore necessary to move the hydraulic metal conduits and/or the electric control and/or power cables to circumvent the volume of the actuator. The hydraulic metal conduits and/or the electric control and/or power cables are thus located at the edge of the volume delimited by the periphery of the wheels and are thus likely to conduct lightning in the electrical system of the aircraft.

The disclosure has the object of securing the installation of a taxiing actuator on an aircraft landing gear against the effects of lightning.

SUMMARY

To this end, an aircraft landing gear is provided, comprising a pair of wheels between which an electric actuator is placed, the electric actuator being at least partially covered with a lightning arrester cowl, the lightning arrester cowl comprising an insulating matrix

[1] Translation of the title as established ex officio.

onto which at least one electrical conductor is attached, the electrical conductor comprising means for electrically connecting the conductor to a ground conductor of the aircraft.

Advantageously, the electrical connection means comprise a rigid mechanical connection of the cowl to the actuator.

According to a preferred embodiment, the electrical connection means comprise a first ground braid extending between the ground conductor and a first connection point to the lightning arrester cowl, the first connection point being located in the lower part of the lightning arrester cowl when the landing gear is in a deployed state. In the sense of the application, the landing gear is in its deployed state when it is outside of the cabin of the aircraft, ready to ensure the connection of the aircraft with the ground.

Advantageously still, the electrical connection means comprise a second ground braid extending between the ground conductor and a second connection point to the lightning arrester cowl, the second connection point being located in the upper part of the lightning arrester cowl when the landing gear is in a deployed state.

The protection is improved when the lightning arrester cowl comprises a first cowl portion and a second cowl portion movably mounted against one another which make it possible to support the curvatures of the flexible electric or hydraulic networks during the sliding of the landing gear when it comes into contact with the ground. The electrical pathway of lightning is reduced when a third ground braid extends between the first cowl portion and the second cowl portion. The cowl can follow the movements of the landing gear when the first cowl portion and the second cowl portion are articulated against one another and/or that the first cowl portion and the second cowl portion are slidingly mounted against one another.

Producing the cowl is particularly economical when the insulating matrix comprises fibreglass and/or when the insulating matrix comprises carbon and/or epoxy resin.

Advantageously, the electrical conductor comprises a metal pad which can be glued on the insulating matrix and/or the electrical conductor comprises a metal mesh which preferably comprises bronze.

An economical production of the cowl is obtained when the electrical connection means of the electrical conductor comprises a metal frame integral with the cowl.

According to a particular embodiment, the electrical connection means of the electrical conductor comprise a mechanical connection of the first ground braid and/or of the second ground braid to the lightning arrester cowl.

The disclosure also applies to an aircraft comprising such a landing gear.

Other characteristics and advantages of the disclosure appear on reading the following description of particular, non-limiting embodiments of the disclosure.

DESCRIPTION OF THE DRAWINGS

FIG. 3 is a schematic front view of the landing gear of FIG. 1;

FIG. 4 is a side view of the cowl of FIG. 3;

DETAILED DESCRIPTION

Figure 1:
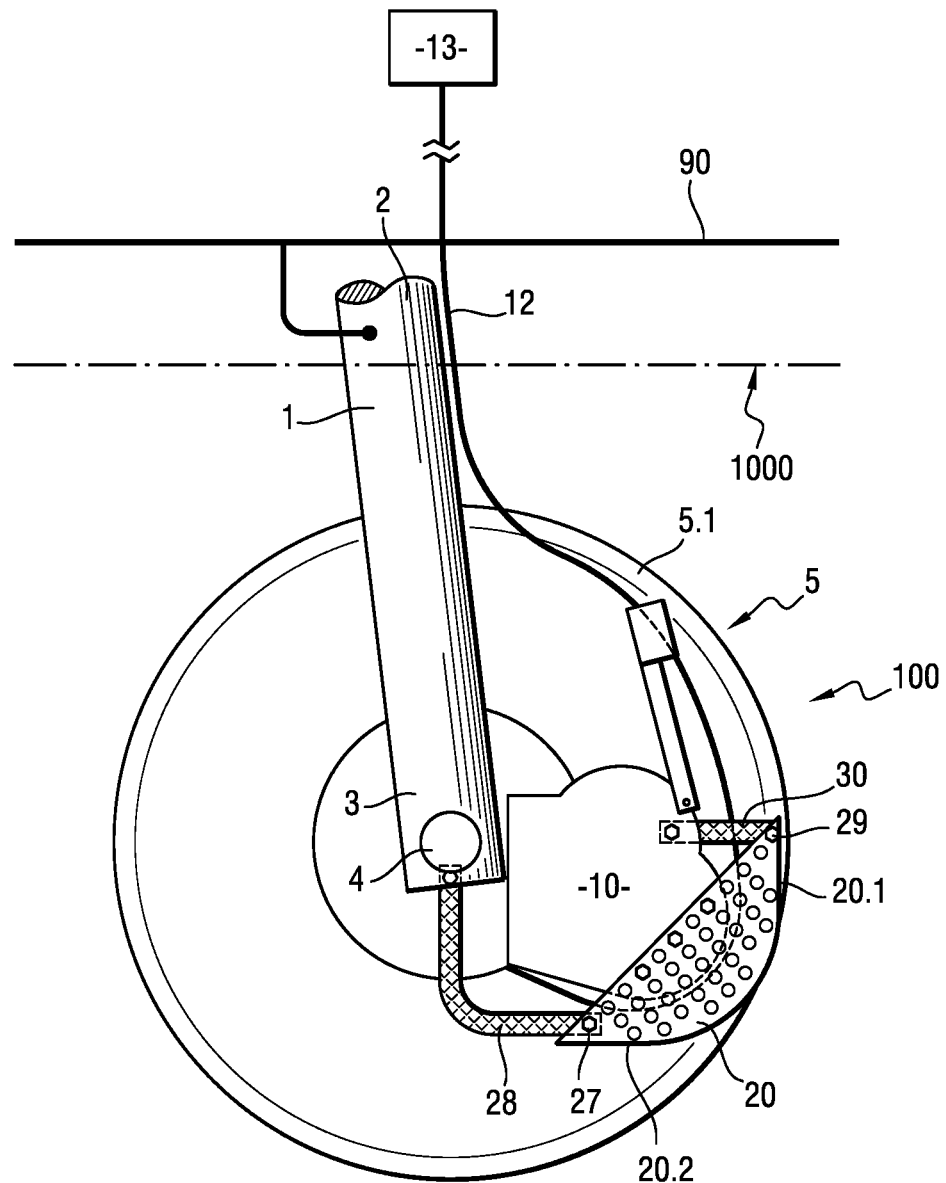
FIG. 1 is a schematic side view of a landing gear according to a first embodiment of the disclosure.
Figure 2:
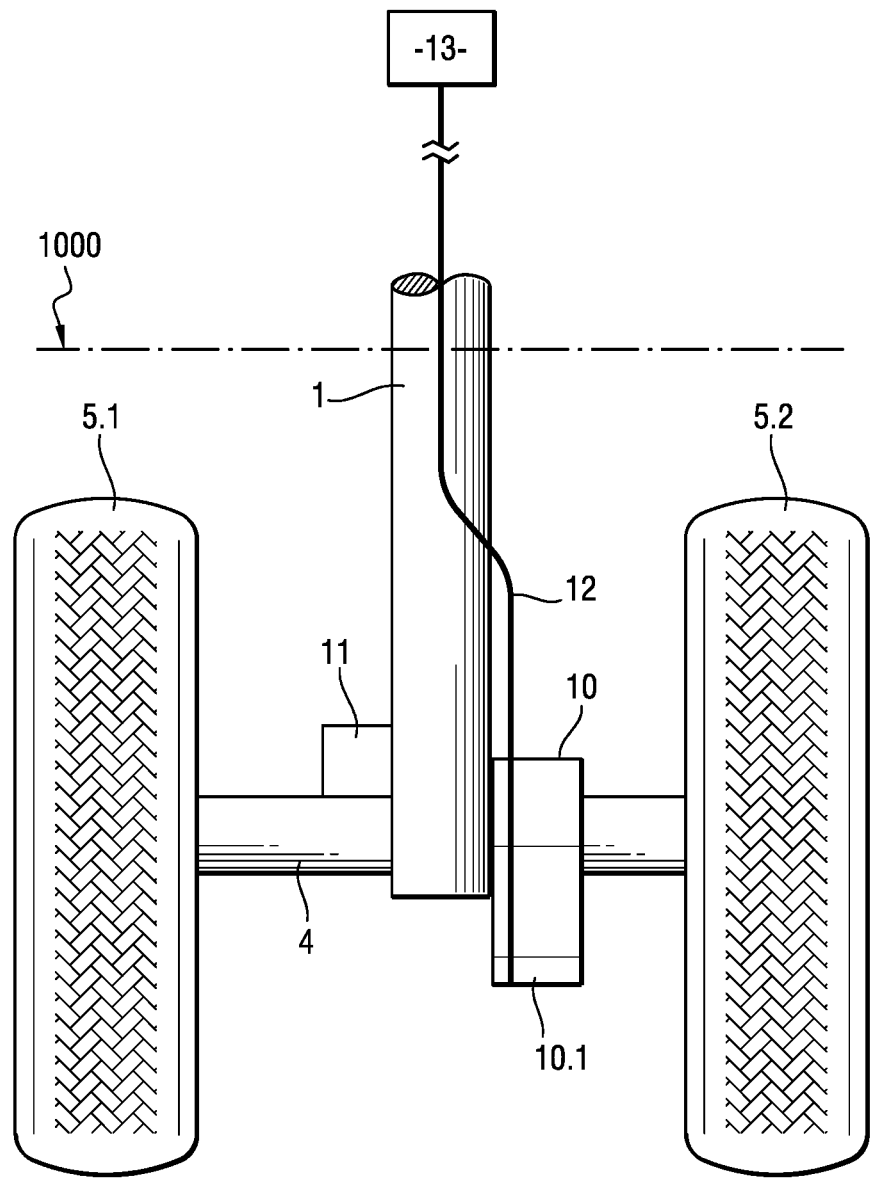
FIG. 2 is a schematic front view of the landing gear of FIG. 1.

In reference to FIGS. 1 to 4, the landing gear according to the disclosure, generally referenced 100, equips an aircraft 1000 and comprises a strut 1 connected at its first end 2 to the aircraft so as to be able to adopt a deployed position (represented in FIG. 1) projecting from the cabin of the aircraft 1000 and a retracted position in which the strut is comprised in the volume of the cabin of the aircraft 1000. The strut 1 has a second end 3 which comprises an axle 4 on which is mounted a pair of wheels 5 comprising a left wheel 5.1 and a right wheel 5.2. An electric actuator 10 of which the frame 10.1 is integral with the strut 1 extends between the left wheel 5.1 and the right wheel 5.2 and is located to the rear of the strut 1, relative to the flight direction of the aircraft 1000. The axle 4 also carries a braking device 11 of the pair of wheels 5. A wire harness 12 connects the actuator 10 and the braking device 11 to an electrical system 13 of the aircraft 1000. The aircraft is provided with a ground circuit 90 to which the strut 1 made of an electrically conductive material is electrically connected. Thus, the frame 10.1 of the actuator 10 is electrically connected to the ground circuit 90.

As can be seen in FIG. 1, and according to a first embodiment of the disclosure, a first lightning arrester cowl 20, lower, extends around a lower quadrant of the actuator 10 and covers a portion of the wire harness 12 which extends along the actuator 10. The lightning arrester cowl 20 comprises a metal frame 21, in this case, rectangular-shaped, the right longitudinal edge 22 and the left longitudinal edge 23 of which respectively comprise three bores 22.1, 22.2, 22.3 and three bores 23.1, 23.2 and 23.3. The three bores 22.1, 22.2, 22.3 and the three bores 23.1, 23.2 and 23.3 respectively accommodate screws for fixing to the actuator 10.

The metal frame 21 is embedded in an insulating matrix 25 comprising fibreglass and which constitutes the casing of the first cowl 20. The casing of the first cowl 20 has a vertical section (according to the representations of FIGS. 1 and 4) substantially triangle-rectangle-shaped. The first cowl 20 thus comprises a rear face 20.1 substantially vertical and a lower surface 20.2 which extends horizontally.

Figure 5:
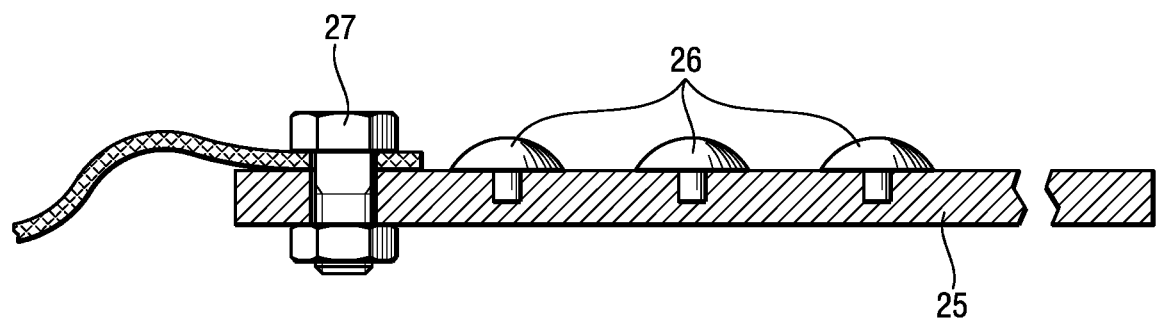
FIG. 5 is a schematic cross-sectional detailed view of the cowl of FIGS. 3 and 4.

As can be seen in FIG. 4, a plurality of conductive pads 26, in this case made of copper, are glued onto the matrix 25. A first conductive bolt 27 located in the lower part of the first cowl 20 when the landing gear 100 is in its deployed state and in contact with the ground (FIGS. 1 and 5) is connected to a first ground braid 28. The first ground braid 28 is connected by screwing to the strut 1. The first bolt 27 constitutes a first connection point of the first cowl 20 to the ground circuit 90.

A second conductive bolt 29 located in the upper part of the first cowl 20 when the landing gear 100 is in its deployed state (FIGS. 1 and 5) is connected to a second ground braid 30. The second ground braid 30 is connected by screwing to the frame 10.1 of the actuator 10. The second bolt 29 constitutes a second connection point of the first cowl 20 to the ground circuit 90.

In operation, when the aircraft 1000 is located on the path of a lightning flash (in flight or on the ground), the lightning flash leaves from the ground and thus strikes a low point of the aircraft 1000. The first cowl 20 being the lowest conductive point of the aircraft 1000, the impact point of the lightning flash is located on the lower surface 20.2 of the first cowl 20. The installation of the first braid 28 makes it possible to minimise the length of the pathway of the lightning flash on the first cowl 20 until it is directed towards the ground circuit 90 of the aircraft 1000. During the movement of the aircraft 1000 frontwards, the impact point of the lightning flash travels along the lower surface 20.2 of the first cowl 20, from front to back and then moves onto the rear face 20.1 of the first cowl 20. The installation of the second braid 30 makes it possible to minimise the length of the pathway of the lightning flash on the first cowl 20 until it is directed towards the ground circuit 90 of the aircraft 1000.

Thus, a device is obtained, ensuring protection of the wire harness 12 against lightning. The device of the disclosure also very effectively protects in an opposite way (lightning starting from the sky) from lightning.

The elements which are identical or similar to those described above will have a numerical reference identical to the latter in the following description of the two other embodiments of the disclosure.

Figure 6:
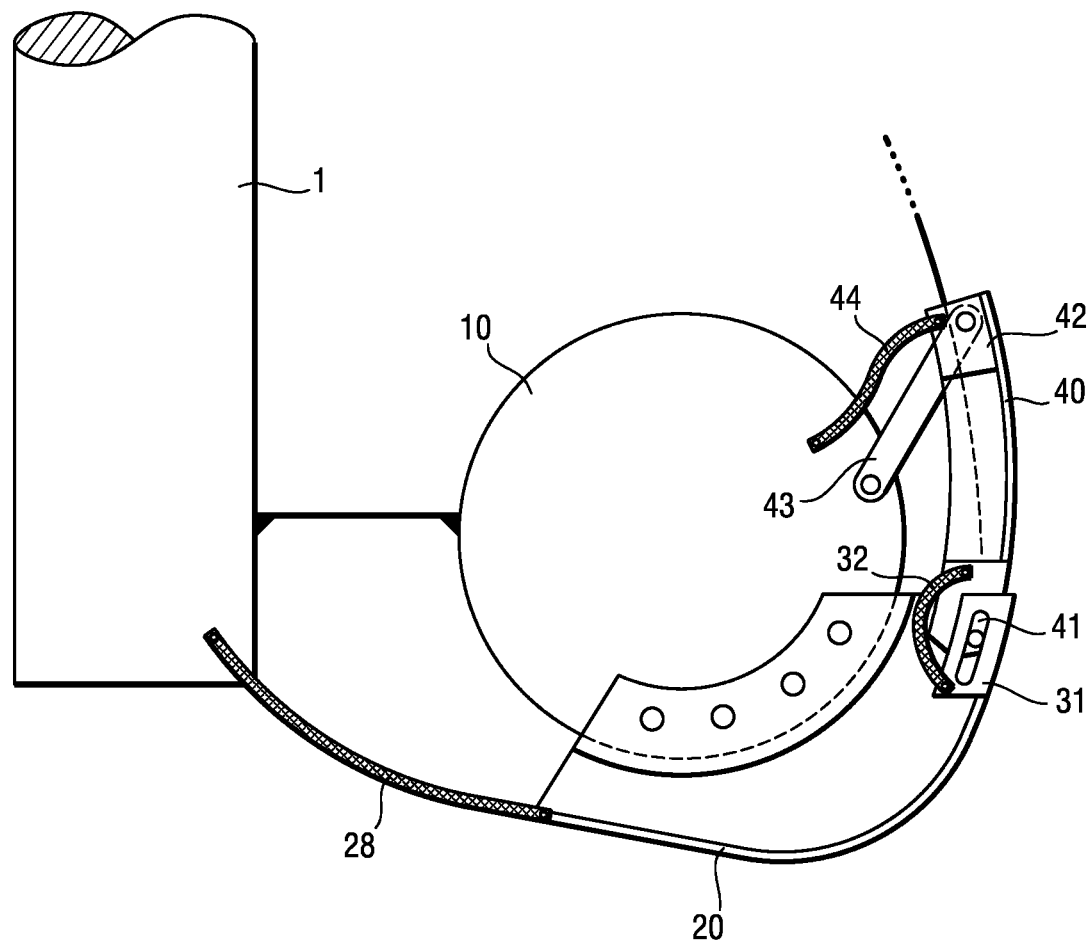
FIG. 6 is a schematic side view of a landing gear according to a second embodiment of the disclosure.

According to a second embodiment represented in FIG. 6, a second lightning arrester cowl 40, upper, is articulated on the first lower cowl 20 using a pivot 41 integral with the second cowl 40 and slidingly mounted in a pair of grooves 31 integral with the first cowl 20. An upper part 42 of the second cowl 40 is connected by a connecting rod 43 articulated on the actuator 10.

A third ground braid 32 extends between the first cowl 20 and the second cowl 40. A fourth ground braid 44 also extends between the upper cowl 40 and the actuator 10.

It is thus understood that the first cowl 20 constitutes a lower lightning arrester cowl portion and the second cowl 40 constitutes an upper lightning arrester cowl.

Figure 7:
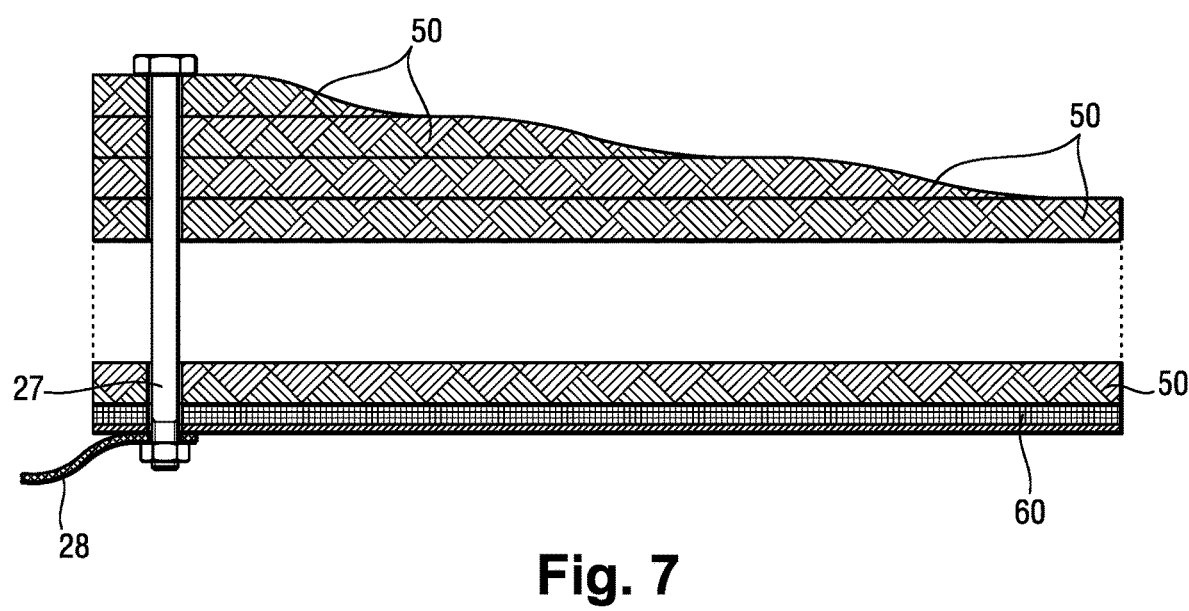
FIG. 7 is a schematic cross-sectional view of a third embodiment of a cowl for a landing gear according to the disclosure.

According to a third embodiment of the disclosure represented in FIG. 7, the insulating matrix 25 comprise carbon and/or epoxy resin, in addition to or in substitution for the fibreglass of the preceding embodiments. Such a material can be made by a stack of layers 50 of fabric which will be impregnated with resin.

As can be seen in FIG. 7, the conductive pads 26 have been replaced by a metal mesh 60 which comprises, in this case, bronze. A paint layer 70 can optionally cover the metal mesh 60. This option also applies to embodiments comprising metal terminals.

Naturally, the disclosure is not limited to the described embodiments but covers any variant coming within the scope of the disclosure as defined by the claims.

In particular:
- although in this case, the cowl comprises a metal frame, the disclosure also applies to other means for electrically connecting the electrical conductor to a ground conductor of the aircraft, like for example a metal mesh, a conductive bar or any other conductive element;
- although in this case, the cowl comprises conductive bolts, the disclosure also applies to other means for electrically connecting the electrical conductor of the cowl to a ground conductor of the aircraft, like for example a screw, a connection lug sealed in the cowl or welded onto the metal frame;
- although in this case, the ground braids are connected to the ground circuit of the aircraft by conductive bolts, the disclosure also applies to other types of mechanical connection of the ground braids to the lightning arrester cowl, like for example a gluing, a screwing, a riveting, a welding, a soldering or a resin application;
- although in this case, the electrical connections between the electrical conductor and the ground conductor comprise one single first ground braid, second ground braid or third ground braid, the disclosure also applies to electrical connections made in the form of several redundant elements, like for example a duplicate third ground braid.

The invention claimed is:

1. A landing gear for an aircraft comprising a pair of wheels between which an electric actuator is placed, the electric actuator being at least partially covered by a lightning arrester cowl, the lightning arrester cowl comprising an insulating matrix onto which at least one electrical conductor is attached, the electrical conductor comprising means for electrically connecting the electrical conductor to a ground conductor of the aircraft, the electrical conductor comprising a metal pad or a metal mesh, wherein the electrical connection means comprise a rigid mechanical connection of the lightning arrester cowl to the electric actuator.

2. The landing gear according to claim 1, wherein the electrical connection means comprise a first ground braid extending between the ground conductor and a first connection point to the lightning arrester cowl, the first connection point being located in the lower part of the lightning arrester cowl when the landing gear is in a deployed state.

3. The landing gear according to claim 2, wherein the electrical connection means comprise a second ground braid extending between the ground conductor and a second connection point to the lightning arrester cowl, the second connection point being located in the upper part of the lightning arrester cowl when the landing gear is in a deployed state.

4. The landing gear according to claim 3, wherein the electrical connection means of the electrical conductor comprise a mechanical connection of the second ground braid to the lightning arrester cowl.

5. The landing gear according to claim 2, wherein the electrical connection means of the electrical conductor comprise a mechanical connection of the first ground braid to the lightning arrester cowl.

6. The landing gear according to claim 1, wherein the insulating matrix comprises carbon and/or epoxy resin.

7. The landing gear according to claim 1, wherein the electrical connection means of the electrical conductor comprise a metal frame integral with the cowl.

8. An aircraft comprising a landing gear according to claim 1.

9. A landing gear for an aircraft comprising a pair of wheels between which an electric actuator is placed, the electric actuator being at least partially covered by a lightning arrester cowl, the lightning arrester cowl comprising an insulating matrix onto which at least one electrical conductor is attached, the electrical conductor comprising means for electrically connecting the electrical conductor to a ground conductor of the aircraft, the electrical conductor comprising a metal pad or a metal mesh, wherein the lightning arrester cowl comprises a first cowl portion and a second cowl portion movably mounted against one another.

10. The landing gear according to claim 9, further comprising a third ground braid extending between the first cowl portion and the second cowl portion.

11. The landing gear according to claim 9 wherein the first cowl portion and the second cowl portion are articulated against one another.

12. The landing gear according to claim 9, wherein the first cowl portion and the second cowl portion are slidingly mounted against one another.

13. The landing gear according to claim 9, wherein the electrical connection means comprise a first ground braid extending between the ground conductor and a first connection point to the lightning arrester cowl, the first connection point being located in the lower part of the lightning arrester cowl when the landing gear is in a deployed state.

14. The landing gear according to claim 13, wherein the electrical connection means comprise a second ground braid extending between the ground conductor and a second connection point to the lightning arrester cowl, the second connection point being located in the upper part of the lightning arrester cowl when the landing gear is in a deployed state.

15. The landing gear according to claim 14, wherein the electrical connection means of the electrical conductor comprise a mechanical connection of the second ground braid to the lightning arrester cowl.

16. The landing gear according to claim 13, wherein the electrical connection means of the electrical conductor comprise a mechanical connection of the first ground braid to the lightning arrester cowl.

17. The landing gear according to claim 9, wherein the insulating matrix comprises carbon and/or epoxy resin.

18. The landing gear according to claim 9, wherein the electrical connection means of the electrical conductor comprise a metal frame integral with the cowl.

19. An aircraft comprising a landing gear according to claim 9.

* * * * *